(12) United States Patent
Wolf-Monheim

(10) Patent No.: US 10,124,640 B2
(45) Date of Patent: Nov. 13, 2018

(54) VEHICLE SUSPENSION MEMBER

(71) Applicant: Ford Global Technologies, LLC, Dearborn, MI (US)

(72) Inventor: Friedrich Peter Wolf-Monheim, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/878,833

(22) Filed: Oct. 8, 2015

(65) Prior Publication Data

US 2016/0101660 A1 Apr. 14, 2016

(30) Foreign Application Priority Data

Oct. 9, 2014 (DE) .................. 10 2014 220 443

(51) Int. Cl.
    *B60G 7/00* (2006.01)

(52) U.S. Cl.
    CPC ............... *B60G 7/001* (2013.01); *B60G 7/00* (2013.01); *B60G 2206/014* (2013.01); *B60G 2206/122* (2013.01); *B60G 2206/16* (2013.01); *B60G 2206/7101* (2013.01); *B60G 2206/7102* (2013.01)

(58) Field of Classification Search
    CPC .............. B60G 7/001; B60G 2206/014; B60G 2206/16; B60G 2206/7101
    See application file for complete search history.

(56) References Cited

U.S. PATENT DOCUMENTS

| 4,772,044 | A | * | 9/1988 | Booher | B29C 70/52 |
| | | | | | 267/149 |
| 5,169,055 | A | | 12/1992 | Peterson et al. | |
| 5,282,396 | A | * | 2/1994 | Crandall | B60G 7/001 |
| | | | | | 403/132 |
| 6,324,940 | B1 | * | 12/2001 | Pazdirek | B29C 53/585 |
| | | | | | 174/47 |
| 6,619,533 | B1 | | 9/2003 | Hootman et al. | |
| 6,655,487 | B2 | | 12/2003 | Mallette et al. | |
| 7,938,417 | B2 | * | 5/2011 | Ersoy | B60G 7/001 |
| | | | | | 280/124.134 |
| 8,100,423 | B2 | * | 1/2012 | Kruse | B60G 7/001 |
| | | | | | 280/124.134 |

(Continued)

FOREIGN PATENT DOCUMENTS

| CN | 203142316 U | 8/2013 |
| DE | 102010018903 A1 | 12/2010 |

(Continued)

*Primary Examiner* — Barry Gooden, Jr.
(74) *Attorney, Agent, or Firm* — Raymond L. Coppiellie; Burgess Law Office, PLLC

(57) ABSTRACT

A suspension member for connecting a vehicle wheel to a vehicle. In one example, the suspension member is a control arm having a control arm body and at least one bearing receiver having a bushing. The control arm body has a recess or opening extending one direction. The control arm body has a reinforcing structure in the recess or opening. The reinforcing structure formed of a material different from that of the control arm body. For example, the reinforcing structure is formed from a fiber-reinforced plastic, while the control arm body at least in regions comprises a lightweight metal or metal alloy.

18 Claims, 4 Drawing Sheets

(56) References Cited

U.S. PATENT DOCUMENTS

| | | | |
|---|---|---|---|
| 2003/0034625 A1* | 2/2003 | Runte | B60G 7/001 280/124.134 |
| 2003/0122339 A1 | 7/2003 | Drabon et al. | |
| 2004/0070129 A1* | 4/2004 | Budde | B60G 7/001 267/188 |
| 2004/0135337 A1* | 7/2004 | Alesso | B60G 7/001 280/124.134 |
| 2006/0175786 A1* | 8/2006 | Streubel | B60G 7/001 280/124.134 |
| 2009/0072506 A1 | 3/2009 | Jang et al. | |
| 2010/0084834 A1* | 4/2010 | Ersoy | B60G 7/001 280/124.1 |
| 2011/0033226 A1* | 2/2011 | Kuroda | B60G 7/001 403/122 |
| 2011/0133421 A1* | 6/2011 | Jeong | B29C 45/14778 280/124.1 |
| 2011/0133422 A1* | 6/2011 | Jeong | B29C 45/14778 280/124.1 |
| 2011/0133423 A1* | 6/2011 | Jeong | B29C 45/14467 280/124.1 |
| 2011/0133425 A1* | 6/2011 | Jeong | B60G 7/001 280/124.134 |
| 2012/0315414 A1* | 12/2012 | Wesch | B60G 7/001 428/34.1 |
| 2013/0328283 A1* | 12/2013 | Korte | B21D 53/90 280/124.134 |
| 2014/0008886 A1* | 1/2014 | Ueno | B60G 7/001 280/124.1 |
| 2015/0115561 A1* | 4/2015 | Nakasato | B60G 7/001 280/124.151 |
| 2016/0031278 A1* | 2/2016 | Schindler | B60G 7/001 280/124.125 |
| 2016/0101660 A1* | 4/2016 | Wolf-Monheim | B60G 7/001 280/124.125 |
| 2016/0107494 A1* | 4/2016 | Narita | B60G 7/001 280/124.134 |
| 2016/0114641 A1* | 4/2016 | Iwasawa | B60G 7/001 280/124.134 |
| 2017/0001489 A1* | 1/2017 | Mosteiro Goyoaga | B60G 7/001 |
| 2018/0154718 A1* | 6/2018 | Kwon | B60G 7/00 |
| 2018/0154719 A1* | 6/2018 | Kwon | B29C 45/14 |

FOREIGN PATENT DOCUMENTS

| | | |
|---|---|---|
| EP | 1318035 A2 | 11/2003 |
| JP | 09030476 A | 2/1997 |

* cited by examiner

VEHICLE SUSPENSION MEMBER

CROSS-REFERENCE TO RELATED APPLICATIONS

Not Applicable.

BACKGROUND OF THE INVENTION

1. Field of the Invention

The present invention relates to a vehicle suspension member and, more specifically, to a suspension member for connecting a vehicle wheel to a vehicle.

2. Description of Related Art

Vehicle suspension members sometimes referred to as control arms or suspension arms form part of the wheel suspension of a vehicle. In particular, individual wheel suspensions include several control arms. Mounting the suspension members rotatably on the vehicle body, chassis, or sub frame enables vehicle wheel movement under suspension compression and rebound. The suspension members rotate to allow substantially vertical mobility while otherwise fixing the vehicle wheel horizontally relative to the remainder of the vehicle.

The configuration and installation position of the suspension member distinguishes between longitudinal, diagonal and transverse control arms wherein the respective orientation relates to the travel direction of the vehicle. For example, a transverse suspension member extends substantially transversely to the direction of travel.

A bushing, normally designed as a composite bearing in the form of a rubber-metal bearing, secures the suspension member to the vehicle and vehicle wheel. The rubber proportion ensures an adequate decoupling and limited mobility of the suspension member relative to its mounting. The suspension member may include a pivot bearing and/or a support joint, for example in the form of a ball joint. The latter serves to couple the suspension member, in one example, to a spring strut or a stub axle of the wheel suspension.

Since the moving parts of the wheel suspension are unsprung masses, efforts are made to reduce their weight as much as possible. In some instances, suspension members have a solid body of aluminum or are composed of multiple formed sheet metal components. The components are joined to increase stability and for individual form adaptation.

As well as improving driving comfort, this allows a reduction in the vehicle weight, a factor becoming increasingly important in particular to reduce fuel consumption. Weight reduction of individual structural components is an important prerequisite for reducing the production of greenhouse gases from vehicles. In the ever more stringent worldwide legal regulations relating to energy efficiency and $CO_2$ emissions lightweight construction of vehicles becomes even more significant.

Suspension members produced in lightweight construction as known in the prior art share a common feature, they are made either from an integral extruded profile of uniform material or from a formed sheet metal. Because of the resulting cavities and/or recesses, in comparison with a solid cross-section, there is a significant weight reduction. The use of an aluminum alloy allows a further reduction in the weight of the control arm, already reduced by its design.

SUMMARY OF THE INVENTION

One example of the invention is a suspension member including an elongated body formed of a first material. The elongated body includes first and second apertures and an opening. A bushing having an inner member and an elastic portion is located in each of the first and second apertures. The elongated body includes a reinforcing member formed of a second material. The reinforcing member located or arranged in the region of the opening.

In a further example, the control arm body is an extruded member wherein the recess extends in the direction of extrusion.

In an additional example, the material of the reinforcing member is particularly preferably a fiber-reinforced plastic, while the control arm body consists at least in regions of a lightweight metal or metal alloy.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
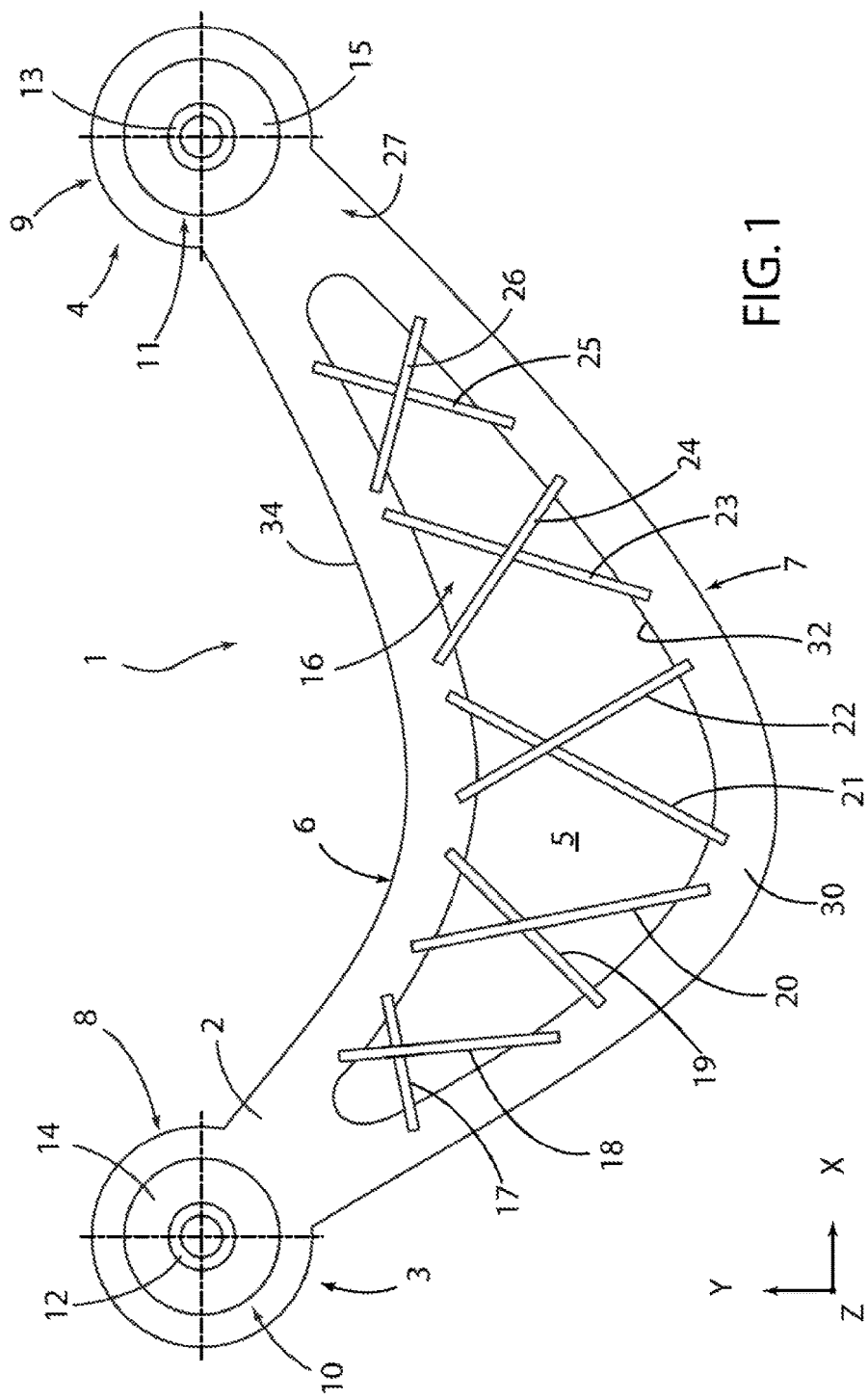
FIG. 1 is a diagrammatic depiction of a control arm according to the invention in a front view.

The following description of the preferred embodiment(s) is merely exemplary in nature and is in no way intended to limit the invention, its application, or uses.

In the different figures, the same parts carry the same reference numerals so these are usually only described once.

FIG. 1 shows a diagrammatic depiction of a suspension member, identified herein as a control arm 1, according to the invention. In the present example, the control arm 1 connects a vehicle wheel (not shown) to a vehicle, also not shown. The control arm 1 has a control arm body 2 that extends in an arcuate path or a sickle shape between the ends 3, 4 of the control arm 1 in a longitudinal direction x.

Figure 3:
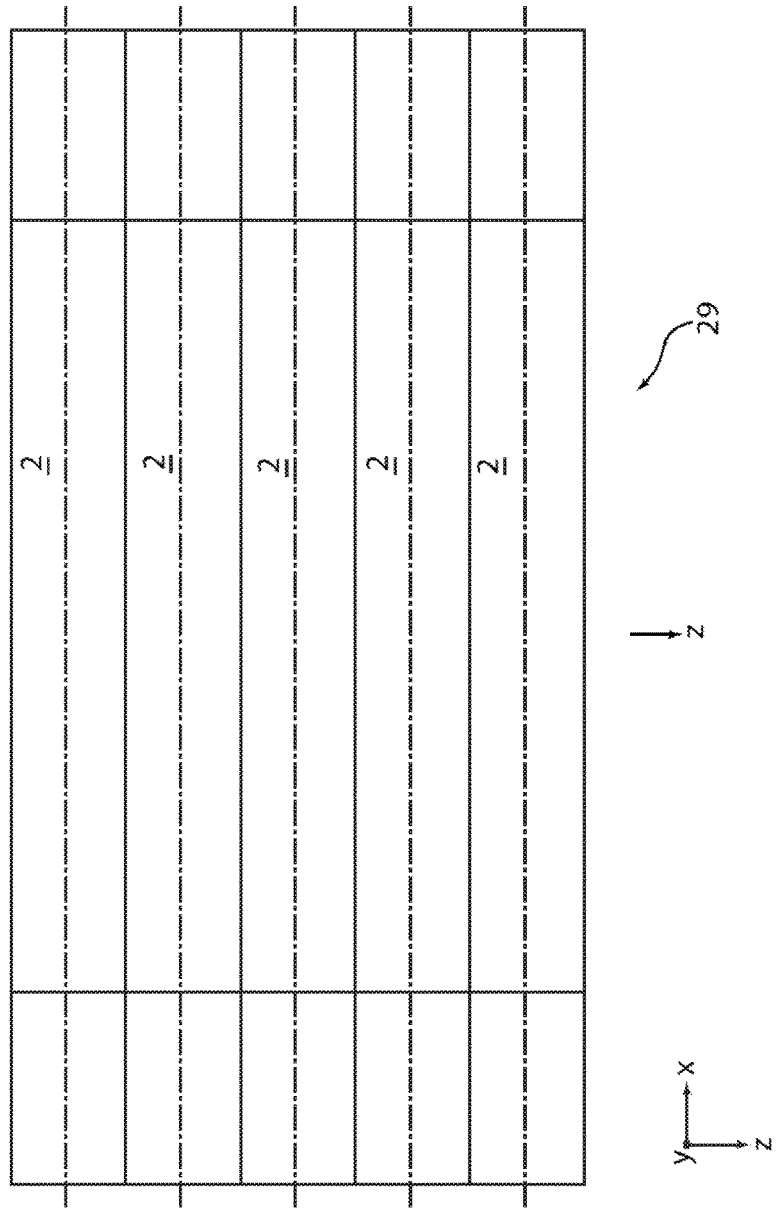
FIG. 3 is a portion of an extruded profile as the basis for the control arm according to the invention from FIGS. 1 and 2, in a top view.

The control arm body 2 of the present example is an extruded member including a bearing receiver 8, 9 at each end thereof preferably made of a lightweight metal or metal alloy. As illustrated in FIG. 3, the control arm body 2 may be cut from an extruded profile 29. First, the extruded profile 29 may advantageously be formed from an initially formless hardenable material, in particular by pressing (extruding) the material under pressure through a die. The shape of the die used defines the cross-sectional shape of the resulting extruded profile 29. The extruded profile 29 may be created with almost any arbitrary length, wherein primarily the cross-section shape determines the configuration of the control arm body cut off later in a quasi-disk form. In addition, a curved configuration of the extruded profile is conceivable, in that the material is pressed through the die for example with different volume advance rates.

As illustrated in FIG. 1, the extruded control arm body 2 has a substantially centrally arranged opening or recess 5, about which the control arm body 2 extends in a frame. The frame-like control arm body 2 delimits the opening or recess 5. The control arm body 2 having a first edge portion 6 and a second edge portion 7. Because of the changing spacing of the two edge portions 6, 7 of the control arm body 2 relative to each other, the recess 5 is effectively surrounded by the edge portions 6, 7 that meet each other again at the ends 3, 4 of the control arm 1. In the disclosed example, the control arm body 2 includes a wall member or portion 30. The wall member or portion 30 is that part of the control body 2 between the edge portions 6, 7 of the control arm body 2 and the recess 5. The wall 30 includes an inner surface 32, adjacent the recess 5, and an outer surface 34. As illustrated, shape or configuration of the recess 5 forms or shapes the boundary of the inner surface 32. During forming of the control body 2, the location of the first and second edge portions 6, 7 and correspondingly the outer surface 34 and the shape or configuration of the recess 5 determines the shape, configuration, and thickness of the wall member or portion 30. In the present example, the wall member or portion 30 is illustrated as having a relatively constant thickness; i.e., the distance between the inner surface 32 and the outer surface 34. However, the thickness of the wall member or portion 30 may vary depending upon particular suspension member design criteria including loads and vehicle dynamics.

In the present example, the control arm 1 has at least one, and preferably only one recess 5. In relation to the extruded profile on which the control arm body 2 may be based, this may advantageously already be configured as a hollow body. After the control arm body 2 has been cut from the extruded profile, see FIG. 3, it then has the corresponding recess, which naturally extends throughout in an extrusion direction of the basic extruded profile.

The two edge portions 6, 7 transform at the ends 3, 4 of the control arm 1 into bearing receivers 8, 9, in each of which is arranged a bushing 10, 11. The bearing receivers 8, 9 form an integral part of the control arm body 2 of uniform material.

Regarding the respective bushings 10, 11, each bushing has an inner part 12, 13 surrounded by an elastic body 14, 15. The two bushings 10, 11 are positioned in the bearing receivers 8, 9 so their respective elastic bodies 14, 15 are each in direct contact with the associated bearing receiver 8, 9.

In the disclosed example, the bearing receiver 8, 9 of the control arm 1 is configured to receive at least one bushing 10, 11. A bushing 10, 11 as disclosed herein includes a connecting element allowing articulated coupling of the control arm 1 with at least one additional component. These components may for example be further suspension components, such as e.g. a stub axle, the vehicle superstructure, a frame, or sub frame. The bushing may for example be a rubber-metal bearing. Alternatively, the bushing may, for example, be a pivot bearing and/or a supporting joint in form of a ball joint.

In the present example, the bearing receiver 8, 9 is configured as a direct integral component of the control arm body 2 of uniform material. In relation to the extruded profile on which the control arm body 2 is based, this cross-section may advantageously already have a corresponding region that can be used directly as a bearing receiver 8, 9 after cutting of the control arm body 2. This allows a very efficient production of the control arm body 2, which requires little or no reworking to configure the bearing receiver 8, 9.

The bushing 10, 11 has an inner part 12, 13 and an elastic body 14 15, wherein the elastic body may surround the inner part at least in portions. The elastic body 14, 15 ensures an advantageous decoupling and/or mobility and the inner part provides for connection with other components relative to the control arm. Although conventional bushings often provide a metallic housing surrounding an elastic body at least on the periphery, the present invention proposes the omission of the metallic housing. The bushing is placed directly in the bearing receiver 8, 9, such that the elastic body of the bushing is in direct contact with the bearing receiver. As well as improved economics, this gives an additional weight advantage. The bushing with its elastic body may for example be pressed into the bearing receiver and/or connected by a material joint, such as for example by gluing or vulcanization. By omitting the conventional process of pressing in bushings equipped with an outer housing, the installation of the bushing is simpler and hence more favorable, whereby the production costs of the control arm 1 can be reduced.

As illustrated in FIG. 1, the control arm body 2 has additional reinforcing structure, seen generally at 16, in the region of the recess 5. The reinforcing structure 16 is formed from a material different from that forming the control arm body 2. In one example, the reinforcing structure 16 is a plastic and in an additional example is a fiber-reinforced plastic.

As illustrated, the reinforcing structure 16 is arranged in the region of the recess 5. The reinforcing structure 16 is formed from a different material from that forming the control arm body 2. In principle, the reinforcing structure 16 may be made of at least one plastic in view of the otherwise normal use of metallic materials for the entire control arm 1. The control arm body 2 may still advantageously consist, at least in regions, of a lightweight metal or metal alloy, while the reinforcing structure 16 connected to it comprises at least one plastic.

Using the respective plastic may advantageously be adapted to the respective requirements. Moreover, the permanent resistance to sometimes aggressive media such as fuel or oil, the possibility of aging and/or embrittlement, e.g. due to UV radiation, should be considered. Here it is responsibility of the person skilled in the art to select the plastic and specify this accordingly. A further basis for decision may for example be the resistance to changing loads (tension and/or compression and/or bending), or even impacts such as occur from contact with bodies thrown up such as e.g. gravel.

Plastic as used means both simple and reinforced plastics, i.e. also fiber-reinforced plastics. The latter may for example have individual fibers, which at least in regions, are embedded in a hardened resin matrix (fiber-composite material). These fibers may for example be metal, glass, carbon, or aramide fibers, but also natural fibers. Plastic also means a combination of a resin matrix and embedded plastic fibers. In view of the heat resistance, the plastic may preferably be a duroplastic. In one example, the reinforcing structure 16 is formed from a fiber-reinforced plastic.

The reinforcing structure 16 has an open structure in a lattice-work. Here the reinforcing structure 16, as shown, has for example five webs 17 to 26 crossing in pairs. The reinforcing structure 16 may have more or fewer than the five crossing web pairs that are shown merely as an example.

The individual webs 17 to 26 each extend between portions of the wall 30 of the frame 30 limited by the recess 5.

As illustrated in FIG. 1, the reinforcing structure 16, illustrated as webs 17 to 26 are placed with their respective ends on one side 27 or 28 of the control arm body 2 to connect opposing or spaced wall portions 30. A suitable adhesive can attach the ends of the respective webs 17 to 26 to the wall 30 of the control arm body 2. While FIG. 1 illustrates the reinforcing structure 16, webs 17 to 26, placed on entirely the first side 27, the reinforcing structure 16, web pairs and/or webs 17 to 26, can be arranged alternately on the first side 27 and then on the second side 28. With such a design, one web pair or web may be arranged on the first side 27 with the next web pair or web on second side 28. In addition, the reinforcing structure 16, web pairs and/or web 17 to 26, can be placed on both sides 27, 28. Alternatively, the reinforcing structure 16 may span the recess 5 at least partially, in a manner not shown.

Figure 4:
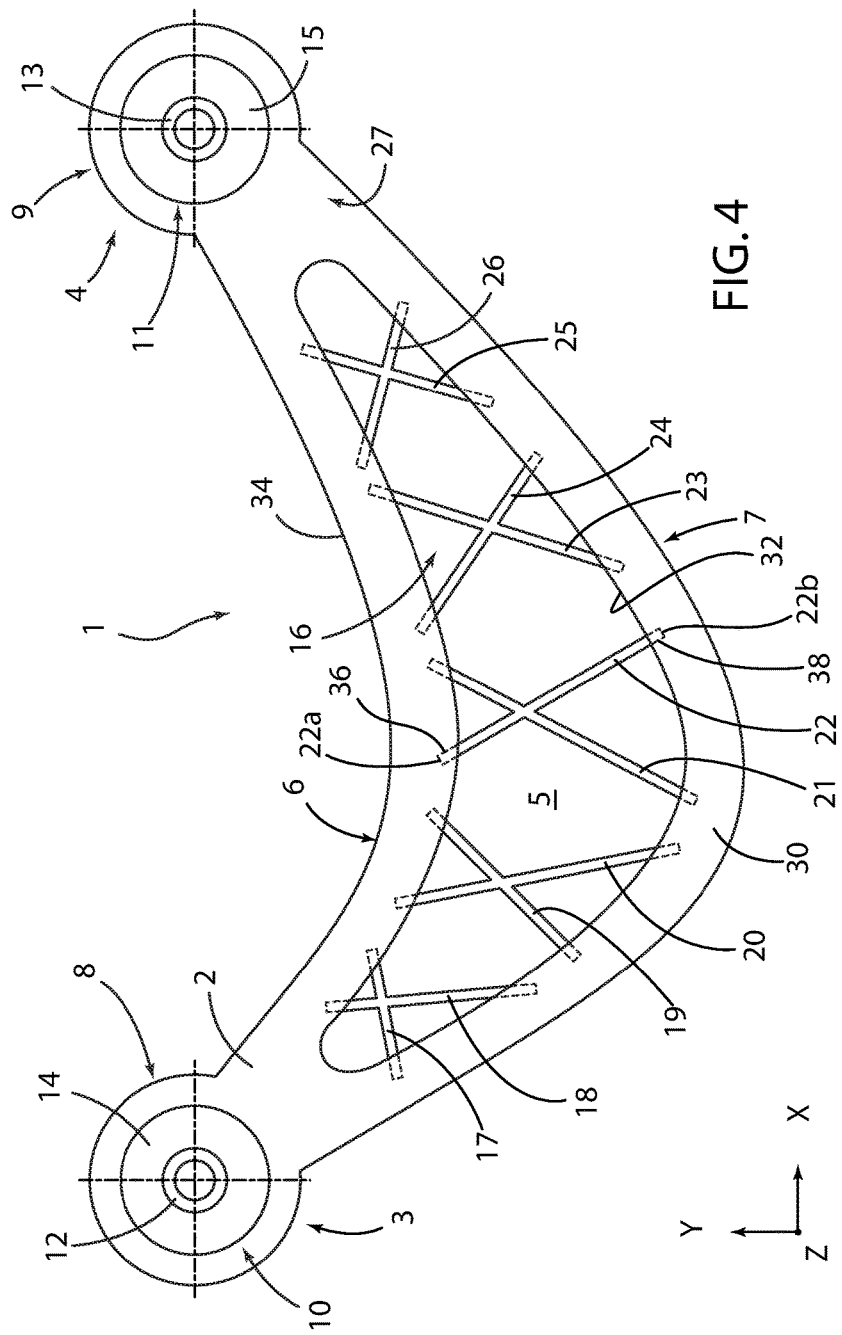
FIG. 4 is a diagrammatic depiction of a control arm according to an additional embodiment of the invention in a front view.

As shown in FIG. 4, the reinforcing structure 16 can be arranged inside the recess 5, wherein the reinforcing structure 16 does not extend outwardly past or is on the respective side surfaces 27, 28. The reinforcing structure 16, i.e. its individual webs 17 to 26, are each connected at the ends thereof at the inner surface 32 of the wall 30. The respective ends of the webs 17 to 26 may be inserted in a receiving portion of the inner surface 32 of the web 30 and perhaps also fixed by form fit or using an adhesive, e.g. by gluing. As an illustrative example, individual web 22 has ends 22a, 22b, positioned in receivers 36, 38; i.e. recesses, sockets, slots, seats, or the like. In a further example, the reinforcing member may include webs connected to the inner surface 32 and webs connected to the respective side surfaces 27, 28. In this manner, the reinforcing structure 16, with its respective webs 17 to 26, connects to the control arm body 2.

The reinforcing structure 16 in the sense of the invention may be a flat formation and/or three-dimensional structure that has a more open configuration than a solid structure in the sense of a full cross-section. In each case, the reinforcing structure 16 applies and transmits forces to reinforce the control arm body 2 statically. The control arm body 2 achieves strength from the reinforcing structure 16. In this way, the control arm body 2 may have a form reduced to a minimum, which in combination with the reinforcing structure 16, permanently fulfills the requirements imposed thereon regarding load-bearing capacity.

In relation to the design of the reinforcing structure, this may include two crossing webs. The term "two crossing webs" means both two webs separate at their crossing point, and webs which visually depict an intersection of two webs. The webs may be connected at the intersection, for example made integrally of uniform material, wherein then four arms extend from the intersection. Two arms in each case may then point in opposing directions, while visually being perceived as a single web.

Irrespective of the configuration of the webs described above, these may each advantageously extend between a frame of the control arm body delimiting the recess. In this way a lattice-work results which connects the opposing portions of the frame. Viewed in cross-section, the webs may be angular, for example triangular and/or rectangular, or round. It is also possible that the webs are produced not only as solid material but also hollow.

The actual connection between the control arm body and the reinforcing structure may for example take place by material joint, such as by gluing. Alternatively, the connection may take place by form fit. For this, the ends of the webs of the reinforcing structure may for example have thickened areas that engage in corresponding recesses inside the frame. For example the ends of the webs may have an enlarged portion, such as a T-shape, received in a correspondingly T-shaped recess. Because of the resulting undercut, particular tensile forces can be safely transmitted. Furthermore, evidently also force-fit connections are conceivable which could be produced alternatively or additionally to those above.

Regarding the actual position of the reinforcing structure, this may for example be arranged at least partially inside the recess of the control arm body. In this way, the external dimensions of the finished control arm are small, since the reinforcing structure runs virtually in the plane of the control arm body within its recess. Alternatively, the reinforcing structure may be arranged at least partially outside the recess and preferably spans at least regions of the recess. This design may lead to more favorable points of attack for the absorption and transmission of forces, resulting in an even better adaptation to the expected loads on the control arm. In principle, a combination of the designs described above regarding the position of the reinforcing structure is conceivable.

Figure 2:
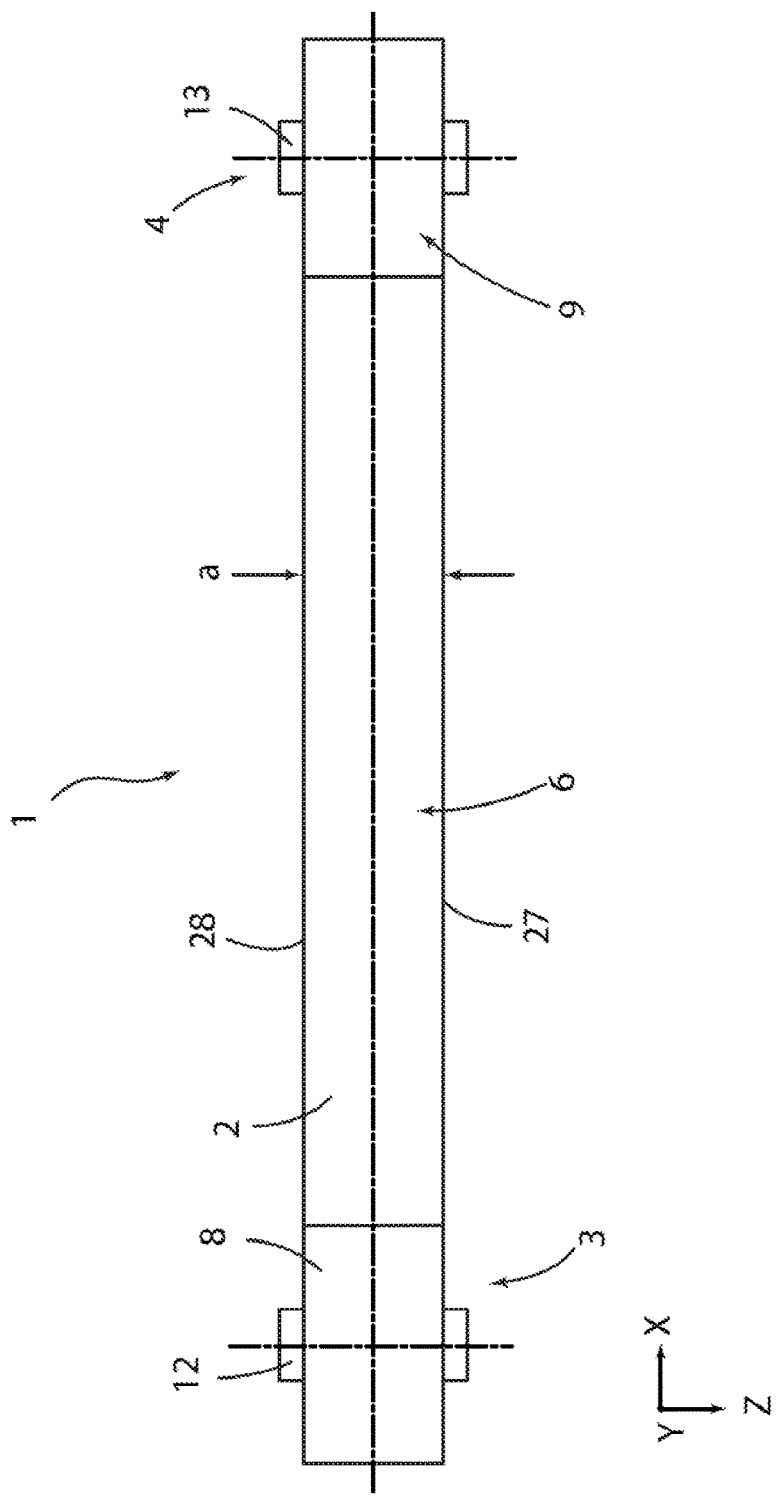
FIG. 2 is the control arm body according to the invention from FIG. 1 in a top view.

FIG. 2 shows the control arm 1 from FIG. 1 in a view rotated by 90° about the longitudinal direction x, looking at the first edge portion 6. As seen, the control arm body 2 in this view has a constant height or thickness a-a extending in the extrusion direction z. In this view, the reinforcing structure 16 would extend inside the recess 5 without protruding beyond sides 27 and 28. As illustrated in FIGS. 1 and 2 the recess 5 extends throughout in the extrusion direction z so the recess 5 is open to the two opposing sides 27, 28 of the control arm body 2. It is furthermore evident that the extrusion direction z in each case is oriented transversely to the longitudinal direction x and to the transverse direction y of the control arm body 2.

FIG. 3 shows an extruded profile 29 forming the basis for the control arm body 2 and extending in the extrusion direction z. Individual control arm bodies 2 are cut from this extruded profile 29, wherein the cross-section (not shown here) of the extruded profile 29 corresponds to the form of the control arm body 2 of FIG. 1.

The open form of the reinforcing structure 16 provides weight saving compared with a solid configuration. The reinforcing structure 16 discussed is distinguished from materials in which the volume is enlarged by means of a propellant gas, such as for example metal foams. The reinforcing structure 16 has a targeted, for example branched, form of individual elements, each of which serve for the proposed application and transmission of force.

The selected form of the reinforcing structure 16 may be adapted ideally to the expected loads, with no quasi-superfluous regions and portions within the reinforcing structure 16. The design of the reinforcing structure 16 may be based for example on a finite element calculation to design and form cross sections precisely in advance and then implement these.

The more open design of the control arm body 2 and reinforcing structure 16 compared with a solid form, and in particular production of the reinforcing structure 16 from a material different from that of the control arm body 2, achieves an advantageous weight reduction while retaining or even increasing the strength of the control arm 1. Further, the control arm 1 results in a gain in driving comfort from the lightened unsprung mass, and the weight of the vehicle can be reduced further; a factor for consideration in obtaining a reduction in fuel consumption and associated emissions.

Although using an extruded profile for the control arm 1, its arrangement may be proposed such that the longitudinal direction of the control arm and the extrusion direction of the extruded profile run at least approximately in the same direction, wherein the orientation in the installation position may preferably be different. Particularly, the extrusion direction of the control arm body 2 or the extruded profile 29 on which it is based may run transversely to the longitudinal direction of the control arm body. In this way, the recess 5 may extend between two opposing sides of the control arm body, wherein the recess may be opened to both sides of the control arm body 2. The control arm body forms a frame, which delimits the recess, wherein the frame advantageously extends between at least two ends of the control arm body.

According to the disclosed example, a very slender form using only little material is achieved for the control arm body 2, which has a positive effect on the weight of the control arm 1.

The present invention here proposes a control arm 1 significantly lighter than the known control arms and which has even further improved strength properties. Reduction of the control arm body—usually heavy—to a design containing at least one through recess achieves a significant weight reduction. The arrangement of the reinforcing structure compensates for initial loss of strength. When lighter materials are used for the reinforcing structure than for the control arm body, the weight advantage achieved by the recess will be largely maintained. In addition, the bushing, which may be integrated directly in the base structure of the control arm body, contributes in particular to further cost reduction.

The invention can be used with a vehicle wheel suspension and may form part of the suspension of the vehicle, in particular a motor vehicle. For this, the vehicle wheel suspension has at least one control arm that connects a vehicle wheel to the vehicle. Preferably, the control arm is a control arm according to the invention as described above, so its features can, in principle, be combined with those of the vehicle wheel suspension.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A suspension member comprising:
   an elongated body, formed of a first material, having first and second apertures and an opening extending entirely through said body between a first side surface and a second side surface;
   a bushing having an inner member and an elastic portion located in each of said first and second apertures; and
   a latticework reinforcing structure, formed solely of a second material, spanning but not completely filling, said opening.

2. The suspension member of claim 1 wherein said latticework reinforcing structure spans said opening and contacts one of said first side surface and said second side surface.

3. The suspension member of claim 1 wherein said elongated body includes an outer surface extending between said first and second side surfaces;
   a wall extending between said outer surface and said opening; and
   said latticework reinforcing structure includes two crossing webs, each web extending across said opening and contacting said wall.

4. The suspension member of claim 1 wherein said first material is metal and said second material is plastic.

5. The suspension member of claim 4 wherein said plastic is fiber-reinforced.

6. The suspension member of claim 5 wherein said fiber is selected from the group consisting of metal, glass, carbon, aramide, and natural fibers.

7. A suspension member comprising:
   an elongated body, formed of a first material, having first and second apertures and an opening;
   a bushing having an inner member and an elastic portion located in each of said first and second apertures; and
   a reinforcing member, formed of a second material, located in said opening;
   said elongated body includes an outer surface;
   a wall extending between said outer surface and said opening;
   said reinforcing member includes two crossing webs, each web extending across said opening and contacting said wall; and
   said two crossing webs are separate at their crossing point.

8. The suspension member of claim 7 wherein said crossing webs are mechanically connected to said wall.

9. The suspension member of claim 7 wherein said crossing webs are adhesively connected to said wall.

10. A suspension member comprising:
    an elongated body, formed of a first material, having a continuous wall portion including an inner surface and an outer surface, said inner surface circumscribing an opening in said elongated body;
    a bushing having an elastic portion located in an aperture; and
    a reinforcing member, formed of a second material, having two crossing webs, each web extending across said opening said two crossing webs are separate at their crossing point.

11. The suspension member of claim 10 wherein said first material is metal and said second material is fiber-reinforced plastic.

12. The suspension member of claim 10 wherein said elongated body includes a first side surface extending between said inner surface and said outer surface and a second side surface extending between said inner surface and said outer surface; and
    said reinforcing member contacting said inner surface of said continuous wall between said first and second side surfaces.

13. The suspension member of claim 10 wherein said elongated body includes a first side surface extending between said inner surface and said outer surface and a second side surface extending between said inner surface and said outer surface; and
    said reinforcing member contacting said at least one of said first and second side surfaces of said continuous wall.

14. The suspension member of claim 10 wherein said reinforcing member connects to said continuous wall.

15. A control arm for connecting a vehicle wheel to a vehicle comprising:
    a metal control arm body extending longitudinally between a first and a second bearing receiver, wherein the control arm body includes an opening extending entirely through said body between a first side surface and a second side surface, said opening extending in a direction transverse to the longitudinal direction of the control arm body;

said bearing receiver being an integral component of the control arm body;

first and second bushings, each of said bushings having an inner part and an elastic body surrounding said inner part, said first and second bushings arranged respectively in said first and second bearing receivers whereby said elastic body of said first bushing is in direct contact with said first bearing receiver and said elastic body of said second bushing is in direct contact with said second bearing receiver; and said control arm body having a latticework reinforcing structure including an open framework of members spanning, but not completely filling, said opening, said reinforcing structure formed solely of a fiber-reinforced plastic.

16. The control arm of claim 15 wherein said latticework reinforcing structure includes crossing webs, said webs extending between an inner surface of said control arm body circumscribing said opening and said two crossing webs are separate at their crossing point.

17. The control arm of claim 16 wherein said latticework reinforcing structure is arranged at least partially inside said opening.

18. The control arm of claim 16 wherein the inner part of said first bushing and the inner part of said second bushing extend transversely to the longitudinally extending control arm body, said first and second side surfaces extending transverse to the inner parts of the first and second bushings and in the direction of the longitudinally extending control arm body, whereby said opening extends between said first side surface and said second side surface of said control arm body.

* * * * *